United States Patent
Lauer et al.

(10) Patent No.: US 11,025,724 B2
(45) Date of Patent: Jun. 1, 2021

(54) TRANSPORT OF CONTROL DATA IN PROXY-BASED NETWORK COMMUNICATIONS

(71) Applicant: Facebook, Inc., Menlo Park, CA (US)

(72) Inventors: Joshua Ryan Lauer, San Francisco, CA (US); Gal Maor, Tel Aviv (IL); Eran Izhak Hirsch, Herzliya (IL)

(73) Assignee: Facebook, Inc., Menlo Park, CA (US)

( * ) Notice: Subject to any disclaimer, the term of this patent is extended or adjusted under 35 U.S.C. 154(b) by 174 days.

(21) Appl. No.: 15/658,326

(22) Filed: Jul. 24, 2017

(65) Prior Publication Data
US 2019/0028548 A1    Jan. 24, 2019

(51) Int. Cl.
*H04L 29/08*    (2006.01)
*H04L 29/06*    (2006.01)

(52) U.S. Cl.
CPC ............ *H04L 67/125* (2013.01); *H04L 67/02* (2013.01); *H04L 67/2819* (2013.01); *H04L 67/42* (2013.01)

(58) Field of Classification Search
CPC ........ H04L 67/125; H04L 67/02; H04L 67/42
See application file for complete search history.

(56) References Cited

U.S. PATENT DOCUMENTS

| | | | | |
|---|---|---|---|---|
| 5,673,322 A * | 9/1997 | Pepe | ................... | H04L 63/0428 705/52 |
| 6,684,257 B1 * | 1/2004 | Camut | ................... | H04L 67/02 709/246 |
| 6,826,610 B1 * | 11/2004 | Sakakura | ................ | H04L 29/06 709/219 |
| 6,895,444 B1 * | 5/2005 | Weisshaar | ............... | H04L 29/06 709/203 |
| 7,383,339 B1 * | 6/2008 | Meenan | .............. | H04L 12/5692 370/352 |
| 7,756,903 B2 * | 7/2010 | Kumar | .................. | G06F 16/951 707/802 |
| 8,468,578 B1 * | 6/2013 | Lu | ......................... | H04L 63/101 726/2 |
| 8,621,065 B1 * | 12/2013 | Saurel | ................... | G06F 21/554 709/224 |
| 9,213,845 B1 * | 12/2015 | Taraki | ................... | H04L 63/102 |
| 9,342,617 B1 * | 5/2016 | Greene | ............... | H04L 41/0266 |

(Continued)

FOREIGN PATENT DOCUMENTS

| | | |
|---|---|---|
| EP | 2601578 A1 | 6/2013 |
| EP | 3018580 | 5/2016 |
| KR | 20100022920 | 3/2010 |

OTHER PUBLICATIONS

European Application No. EP18179599.8, "Extended European Search Report", dated Oct. 22, 2018, 10 pages.

(Continued)

*Primary Examiner* — Jerry B Dennison
(74) *Attorney, Agent, or Firm* — Kilpatrick Townsend & Stockton

(57) ABSTRACT

The present disclosure relates to techniques for controlling a client device. The techniques may include receiving, from a client device, a request for a web resource; generating control data associated with one or more functionalities of the client device; and transmitting a response to the client device including the web resource and the control data to control the one or more functionalities of the client device.

28 Claims, 7 Drawing Sheets

(56) References Cited

U.S. PATENT DOCUMENTS

| | | | | |
|---|---|---|---|---|
| 9,697,189 B2* | 7/2017 | Kennedy | | G06F 40/149 |
| 9,747,434 B1* | 8/2017 | Avital | | G06F 21/44 |
| 10,075,554 B2* | 9/2018 | Narasimhan | | G06F 16/9577 |
| 10,282,401 B2* | 5/2019 | Scoda | | G06F 40/154 |
| 2003/0026231 A1* | 2/2003 | Lazaridis | | H04L 29/06 |
| | | | | 370/338 |
| 2005/0240631 A1* | 10/2005 | Willard | | H04N 21/643 |
| 2005/0271207 A1* | 12/2005 | Frey | | H04L 9/0668 |
| | | | | 380/263 |
| 2006/0056415 A1* | 3/2006 | Lee | | H04L 12/14 |
| | | | | 370/392 |
| 2006/0200566 A1* | 9/2006 | Ziebarth | | H04L 63/12 |
| | | | | 709/227 |
| 2007/0033569 A1* | 2/2007 | Davidson | | G06F 16/9574 |
| | | | | 717/103 |
| 2007/0061488 A1* | 3/2007 | Alagappan | | G06F 16/9577 |
| | | | | 709/246 |
| 2008/0071896 A1* | 3/2008 | Cohen | | G06F 21/50 |
| | | | | 709/223 |
| 2009/0119382 A1* | 5/2009 | Bakker | | H04L 67/02 |
| | | | | 709/206 |
| 2009/0172802 A1* | 7/2009 | Mosek | | H04L 67/28 |
| | | | | 726/12 |
| 2009/0182843 A1* | 7/2009 | Hluchyj | | H04L 29/06 |
| | | | | 709/219 |
| 2010/0057830 A1* | 3/2010 | Takala | | H04L 67/20 |
| | | | | 709/203 |
| 2010/0058204 A1* | 3/2010 | Wilson | | G06F 16/9535 |
| | | | | 715/760 |
| 2010/0153568 A1* | 6/2010 | Uola | | H04L 67/02 |
| | | | | 709/229 |
| 2012/0036178 A1* | 2/2012 | Gavini | | H04L 67/2804 |
| | | | | 709/203 |
| 2012/0155389 A1* | 6/2012 | McNamee | | H04L 45/306 |
| | | | | 370/328 |
| 2013/0031191 A1* | 1/2013 | Bott | | H04W 12/0027 |
| | | | | 709/206 |
| 2013/0067085 A1* | 3/2013 | Hershko | | H04L 61/157 |
| | | | | 709/225 |
| 2013/0097616 A1* | 4/2013 | Bickle | | G06F 9/465 |
| | | | | 719/315 |
| 2013/0151708 A1 | 6/2013 | Shelby et al. | | |
| 2013/0173737 A1* | 7/2013 | Liu | | H04N 21/6377 |
| | | | | 709/213 |
| 2013/0198613 A1* | 8/2013 | Scoda | | G06F 40/154 |
| | | | | 715/239 |
| 2013/0229976 A1* | 9/2013 | Srinivasan | | H04W 36/0027 |
| | | | | 370/315 |
| 2013/0232232 A1* | 9/2013 | Reza | | H04L 65/80 |
| | | | | 709/219 |
| 2013/0340031 A1* | 12/2013 | Amit | | H04W 12/0027 |
| | | | | 726/1 |
| 2014/0173111 A1* | 6/2014 | Varner | | H04L 63/0281 |
| | | | | 709/225 |
| 2014/0207911 A1* | 7/2014 | Kosmach | | H04L 65/1083 |
| | | | | 709/218 |
| 2014/0365631 A1 | 12/2014 | Luna | | |
| 2015/0019686 A1* | 1/2015 | Backholm | | H04W 4/18 |
| | | | | 709/217 |
| 2015/0023160 A1* | 1/2015 | Alisawi | | H04L 67/322 |
| | | | | 370/230 |
| 2015/0100679 A1* | 4/2015 | Chandaka | | H04L 67/2819 |
| | | | | 709/224 |
| 2015/0208352 A1* | 7/2015 | Backholm | | H04W 52/0251 |
| | | | | 455/574 |
| 2015/0249852 A1* | 9/2015 | Tang | | H04N 21/25883 |
| | | | | 725/28 |
| 2015/0249864 A1* | 9/2015 | Tang | | G06Q 30/00 |
| | | | | 725/28 |
| 2016/0050241 A1* | 2/2016 | Lotfallah | | H04L 67/02 |
| | | | | 709/219 |
| 2016/0072847 A1* | 3/2016 | Bremen | | H04L 63/0236 |
| | | | | 726/1 |
| 2016/0094560 A1* | 3/2016 | Stuntebeck | | H04L 63/08 |
| | | | | 726/1 |
| 2017/0302619 A1* | 10/2017 | Porika | | H04L 45/56 |
| 2018/0013848 A1* | 1/2018 | Schejter | | G06F 16/9535 |
| 2018/0018154 A1* | 1/2018 | Burns | | G06F 3/0484 |
| 2018/0074795 A1* | 3/2018 | Benge | | H04L 65/4084 |
| 2018/0089652 A1* | 3/2018 | Hiranandani | | G06Q 40/12 |
| 2018/0097840 A1* | 4/2018 | Murthy | | H04L 63/02 |
| 2018/0270710 A1* | 9/2018 | Hua | | H04W 28/10 |
| 2019/0028548 A1* | 1/2019 | Lauer | | H04L 67/42 |
| 2019/0141013 A1* | 5/2019 | Mail | | G06Q 30/0241 |
| 2019/0163931 A1* | 5/2019 | Wolverton | | G06F 21/6245 |
| 2019/0173849 A1* | 6/2019 | Lapidous | | H04L 12/4633 |
| 2020/0067929 A1* | 2/2020 | Lof | | H04L 63/102 |

OTHER PUBLICATIONS

International Application No. PCT/US2017/043787, International Search Report and Written Opinion dated Apr. 18, 2018, 18 pages.
Notice of Preliminary Rejection for KR application No. 10-2020-7004400, dated Mar. 27, 2021, 4 pages. English Translation.

* cited by examiner

400

| | Elements of App | Configuration |
|---|---|---|
| Code_0 | Search | Display a search input text box |
| Code_1 | Search | Direct search query to DOODLE search engine |
| Code_2 | Output interface | Display an opaque layer |

TRANSPORT OF CONTROL DATA IN PROXY-BASED NETWORK COMMUNICATIONS

BACKGROUND

Remote control of a computing device typically requires the use of new or additional communications capabilities for carrying control data. For example, a computing device (e.g., a computer, a smart phone, etc.) can be configured to provide a set of functionalities. The functionalities can be provided by software applications operating on the computing device, and/or by hardware components of the computing device. The configuration can be performed based on control data associated with the subject of the configuration. The control data may be, for example, a software patch, a set of parameters to be provided to a software application, a set of values to be stored into a hardware register, etc.

In a data network, the computing device may receive the control data from another device (e.g., a server) in a remote configuration process. To initiate configuration process, the computing device determines a target functionality to be updated or added, and the control data for the target functionality. The computing device can then establish a client-server communication channel with the server (e.g., based on Transmission Control Protocol (TCP)), and then transmit a request to the server for the control data via the communication channel. The server can process the request, and transmit a response including the requested control data to the computing device via the communication channel. The computing device then verifies that the response includes the requested control data, and then update the target functionality based on the control data.

There are a number of drawbacks with this arrangement. For example, the management of the communication channel, as well as the requests and responses for obtaining the control data, increase the complexity of the configuration process and require more computing resources. Moreover, the transmission of these requests and responses may also consume considerable amount of network bandwidth, and create additional burden on the network infrastructure.

SUMMARY

The present disclosure relates to techniques for controlling a client device. More specifically, in certain aspects of the present disclosure, a computer-implemented control method is provided. The method may include receiving, from a client device, a first request for a web resource; generating a second request based on the first request; transmitting the second request to a web server for the web resource; generating control data associated with one or more functionalities of the client device; receiving a first response including the web resource from the web server; generating a second response including the control data and the web resource; and transmitting the second response to the client device to control the one or more functionalities of the client device.

Certain embodiments of the computer-implemented method may be performed by a server proxy. In some embodiments, the client device may include an app and a local proxy; and the first request may be generated by the local proxy based on a web access request received by the app.

According to certain embodiments of the present disclosure, the first and second requests may be HTTP requests; the first and second responses may be HTTP responses; and the control data may be included in one or more headers of the second response.

According to certain embodiments of the present disclosure, the one or more functionalities may be associated with the app. In some embodiments, the control data may include information comprising at least one of: a configuration for displaying a webpage on the app, a configuration for performing a search with the app, or an user interface configuration of the app.

According to certain embodiments of the present disclosure, the one or more functionalities may be associated with the local proxy. In some embodiments, the first request may be received from the local proxy through a first TCP connection established between the local proxy and the server proxy; the control data may control the local proxy to establish a second TCP connection with the web server, and to transmit a third request to the web server through the second TCP connection. In some embodiments, the control data may control the app to provide an activable interface element; the control data may control the local proxy to establish the second TCP connection and to transmit the third request based on detecting the activable interface element being activated.

According to certain embodiments, the control data may be generated based on the first request. In some embodiments, the control data may be encrypted with a signature.

According to certain embodiments of the present disclosure, a system is provided. The system may include one or more processors; and a non-transitory computer-readable medium storing instructions that, when executed by the one or more processors, cause the one or more processors to perform operations including: receiving, from a client device, a first request for a web resource; generating a second request based on the first request; transmitting the second request to a web server for the web resource; generating control data associated with one or more functionalities of the client device; receiving a first response including the web resource from the web server; generating a second response including the control data and the web resource; and transmitting the second response to the client device to control the one or more functionalities of the client device.

According to certain embodiments of the present disclosure, the system may be part of a server proxy. The client device may include an app and a local proxy; and the first request may be generated by the local proxy based on a web access request received by the app.

According to certain embodiments of the present disclosure, the first and second requests may be HTTP requests; the first and second responses may be HTTP responses; and the control data may be included in one or more headers of the second response.

According to certain embodiments of the present disclosure, the one or more functionalities may be associated with the app. In some embodiments, the control data may include information comprising at least one of: a configuration for displaying a webpage on the app, a configuration for performing a search with the app, or an user interface configuration of the app.

According to certain embodiments of the present disclosure, the one or more functionalities may be associated with the local proxy. In some embodiments, the first request may be received from the local proxy through a first TCP connection established between the local proxy and the server proxy; the control data may control the local proxy to establish a second TCP connection with the web server, and to transmit a third request to the web server through the second TCP connection. In some embodiments, the control data may control the app to provide an activable interface element; the control data may control the local proxy to establish the second TCP connection and to transmit the third request based on detecting the activable interface element being activated.

According to certain embodiments of the present disclosure, the control data may be generated based on the first request.

In certain embodiments of the present disclosure, a non-transitory computer-readable storage medium is provided. The non-transitory computer-readable storage medium may store a plurality of instructions executable by one or more processors. The plurality of instructions, when executed by the one or more processors, may cause the one or more processors to receive, from a client device, a first request for a web resource; generate a second request based on the first request; transmit the second request to a web server for the web resource; generate control data associated with one or more functionalities of the client device; receive a first response including the web resource from the web server; generate a second response including the control data and the web resource; and transmit the second response to the client device to control the one or more functionalities of the client device.

In certain aspects of the present disclosure, a computer-implemented control method is provided. The computer-implemented control method may comprise: receiving, from a client device, a first request for a web resource; generating a second request based on the first request; transmitting the second request to a web server for the web resource; generating control data associated with one or more functionalities of the client device; receiving a first response including the web resource from the web server; generating a second response including the control data and the web resource; and transmitting the second response to the client device to control the one or more functionalities of the client device.

Certain embodiments of the computer-implemented method may be performed by a server proxy. In some embodiments, the client device may include an app and a local proxy; and the first request may be generated by the local proxy based on a web access request received by the app. In some embodiments, the one or more functionalities may be associated with the app. In some embodiments, the one or more functionalities may be associated with the local proxy.

According to certain embodiments of the present disclosure, the first and second requests may be HTTP requests; the second and second responses may be HTTP responses; and the control data may be included in one or more headers of the second response.

According to certain embodiments of the present disclosure, the one or more functionalities may be associated with the app. Optionally, the control data includes information comprising at least one of: a configuration for displaying a webpage on the app, a configuration for performing a search with the app, or an user interface configuration of the app.

According to certain embodiments of the present disclosure, the one or more functionalities may be associated with the local proxy. Optionally, the first request is received from the local proxy through a first TCP connection established between the local proxy and the server proxy, and the control data may control the local proxy to establish a second TCP connection with the web server, and to transmit a third request to the web server through the second TCP connection. Optionally, the control data may controls the app to provide an activable interface element, and the control data may control the local proxy to establish the second TCP connection and to transmit the third request based on detecting the activable interface element being activated.

According to certain embodiments of the present disclosure, the control data may be generated based on the first request. In some embodiments, the control data may be encrypted with a signature.

According to certain embodiments of the present disclosure, a system is provided. The system may include one or more processors; and a non-transitory computer-readable medium storing instructions that, when executed by the one or more processors, cause the one or more processors to perform operations including: receiving, from a client device, a first request for a web resource; generating a second request based on the first request; transmitting the second request to a web server for the web resource; generating control data associated with one or more functionalities of the client device; receiving a first response including the web resource from the web server; generating a second response including the control data and the web resource; and transmitting the second response to the client device to control the one or more functionalities of the client device.

According to certain embodiments of the present disclosure, the system may be part of a server proxy. The client device may include an app and a local proxy; and the first request may be generated by the local proxy based on a web access request received by the app.

According to certain embodiments of the present disclosure, the first and second requests may be HTTP requests; the first and second responses may be HTTP responses; and the control data may be included in one or more headers of the second response.

According to certain embodiments of the present disclosure, the one or more functionalities may be associated with the app. Optionally, the control data may include information comprising at least one of: a configuration for displaying a webpage on the app, a configuration for performing a search with the app, or an user interface configuration of the app.

According to certain embodiments of the present disclosure, the one or more functionalities may be associated with the local proxy. Optionally, the first request may be received from the local proxy through a first TCP connection established between the local proxy and the server proxy; the control data may control the local proxy to establish a second TCP connection with the web server, and to transmit a third request to the web server through the second TCP connection. Optionally, the control data may control the app to provide an activable interface element; the control data may control the local proxy to establish the second TCP connection and to transmit the third request based on detecting the activable interface element being activated.

According to certain embodiments of the present disclosure, the control data may be generated based on the first request.

According to certain embodiments, one or more computer-readable non-transitory storage media may embody software that is operable when executed to perform a method according to the disclosed embodiments.

According to certain embodiments, a system may comprise: one or more processors; and at least one memory coupled to the processors and comprising instructions executable by the processors, the processors operable when executing the instructions to perform a method according to the disclosed embodiments.

According to certain embodiments, a computer program product, preferably comprising a computer-readable non-transitory storage media, may be operable when executed on a data processing system to perform a method according to the disclosed embodiments.

BRIEF DESCRIPTION OF THE DRAWINGS

Illustrative embodiments are described in detail below with reference to the following figures:

FIG. 4 is a simplified block diagram of an example mapping table that maps the configurations to different control data values, according to certain aspects of the present disclosure;

DETAILED DESCRIPTION

I. Remote Configuration of a Computing Device

A computing device (e.g., a computer, a smart phone, etc.) can be configured to provide a set of functionalities. The functionalities can be provided by software applications installed on the computing device, and/or by hardware components of the computing device.

Figure 1:
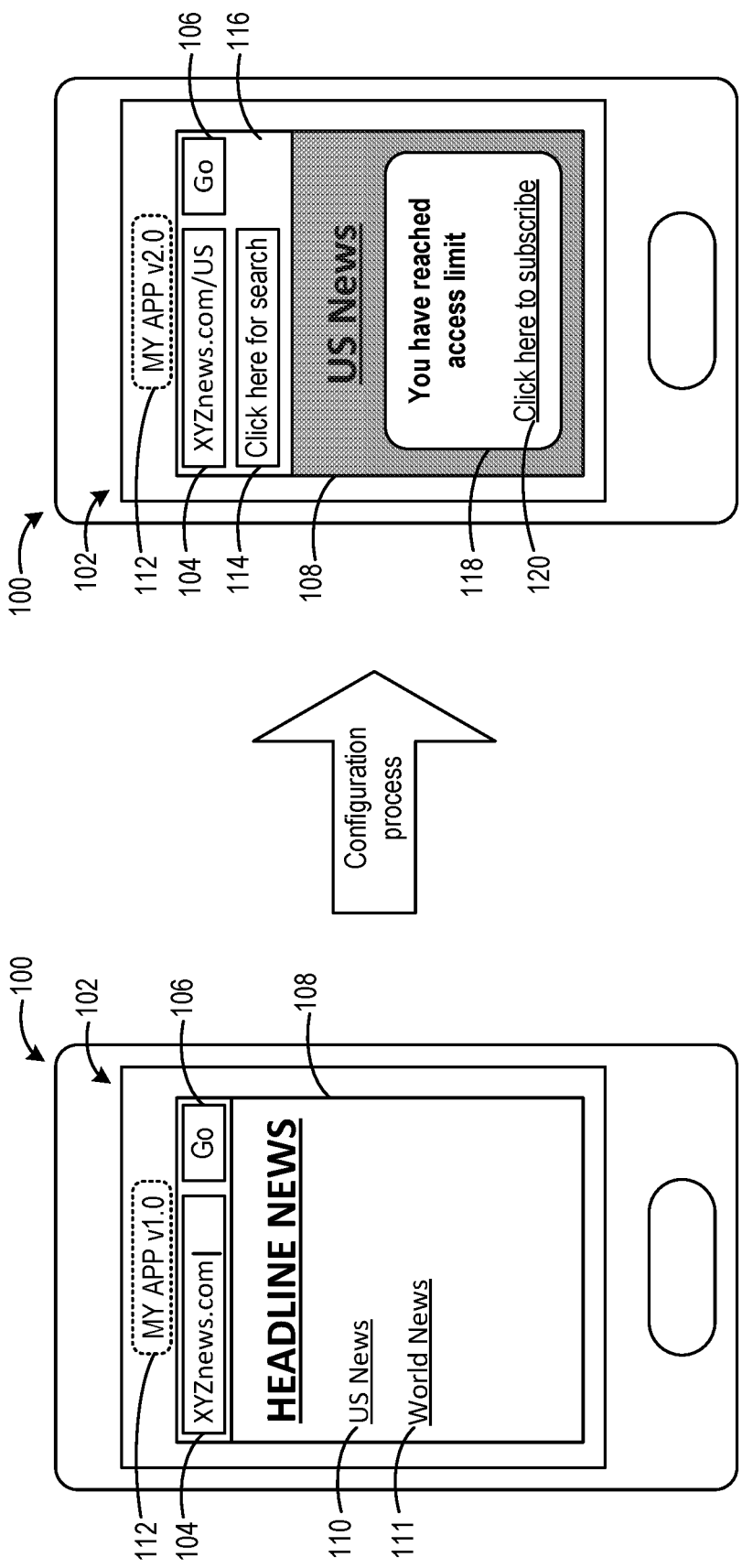
FIG. 1 illustrates an example of configuring the software application installed on a computing device.

FIG. 1 illustrates an example of configuring the software application operating on a computing device. As shown in FIG. 1, computing device 100 operates a software application ("app") labelled "MY_APP." The app provides an interface 102 for receiving an input and for outputting information. In the example shown in FIG. 1, the app may provide web-browsing functions, for which interface 102 includes a text box 104 for inputting a web address, an activable element 106 for triggering the transmission of a web access request directed to the web address in text box 104, and an output interface 108 for displaying content associated with the web address. The content may also include one or more activable elements (e.g., universal resource links (URL) 110 and 111) for triggering the transmission of web access requests. Interface 102 may also display other information including, for example, version information 112.

Computing device 100 may receive control data, through a configuration process, to update various aspects of the app. For example, as shown in FIG. 1, the version of the app may be updated to include a search function, for which an activable search element 114 is provided. The web-browsing functions of the app can also be updated. For example, a navigation element 116 can be provided as a result of the update. Further, the app (or other aspects of computing device 100) can also updated to provide a different web-browsing function, to display different content, etc. For example, as shown in FIG. 1, the app may be configured to implement a variable access policy. As part of the policy, the app may provide access to a zero-rated web service. Such a zero-rate web service may allow the user, through the app, to access the Internet with certain restriction. For example, access may be available until the number of accesses hits a cap, which can trigger a configuration process. After the configuration process, the app may stop providing access to the zero-rated web service, and display a page indicating that the free access has ended.

Computing device 100 may receive the control data from a server. Currently, a computing device may initiate transmission of control data by establishing, for example, a TCP packet-based communication channel with the server (e.g., based on TCP). The computing device then transmits TCP packets including a request for the control data to the server via the communication channel. The server can process the request, and transmit TCP packets including the requested control data to the computing device via the communication channel. Although the computing device may receive the requested control data through such arrangement, the management of the communication channel, as well as the requests and responses for obtaining the control data, increase the complexity of the configuration process and require more computing resources. Moreover, the transmission of these requests and responses may also consume considerable amount of network bandwidth, and create additional burden on the network infrastructure.

Disclosed herein are techniques for remote configuration of a computing device leveraging an existing communication between the computing device and a server to provide the control data to the computing device. The server can include a server proxy that operates as an intermediary between the computing device and a host of certain web resources (e.g., web contents, which may include document files, media files, etc.). The computing device may establish a TCP communication channel with the server. The computing device may transmit, via the TCP communication channel, a web access request (e.g., an Hypertext Transfer Protocol (HTTP) request) to the server for requesting a web resource. Based on the web access request, the server may transmit a web access response (e.g., a HTTP response) containing the requested web resource back to the computing device, also via the TCP communication channel. The server also transmits control data as part of the web access response to the computing device.

The server may be configured to transmit the control data to the computing device in various circumstances. For example, referring back to FIG. 1, the server may be triggered by one or more external events to update the "MY_APP" app to a different version. The external events can include, for example, the expiration of a timer (e.g., the server is configured to update to the app at a certain time point), the reception of update patches for the app from another server, etc. After being triggered by the external event, the server proxy may monitor for a web access request transmitted by the app to be updated. When such a web access request is received, for example from computing device 100 via a TCP communication channel, the server can include the requested web resources (e.g., web content), as well as the control data, in a web access response. The server can then transmit the web access response including the control data to computing device 100, via the same TCP communication channel that transmits the web access request.

The server may also determine the control data to be transmitted based on other information including, for example, the web resource requested by the web access request. For example, as discussed above with reference to FIG. 1, computing device 100 may be in communication with the server to implement a variable access policy. Computing device 100 may provide access to a zero-rated web service (e.g., free access to news content), and then change the access to the web service when certain conditions are met. For example, the free access to news content may be stopped when a pre-determined number of web access requests directed to the content hosted on the web site "XYZnews.com" has been reached. The server may keep track of a number of such web access requests received from computing device 100, and transmit control data to computing device 100 to deny access to the content when the number is reached. Referring to the example of FIG. 1, a user may activate URL 110 (or other activable elements) to access the content associated with "US News." The selection of URL 110 may cause the computing device to transmit an HTTP request to the server. After receiving the HTTP request, the server may determine that a number of such request received from computing device 100 has reached a limit. The server may include the requested content (or other content) in a HTTP response to be transmitted to computing device 100. However, the server may include control data in the HTTP response that changes some of the elements of interface 102, to deny the user access to the requested content. For example, as shown in FIG. 1, the control data may cause output interface 108 to display an opaque layer when rendering the requested content. The control data may also cause output interface 108 to display a message 118 to indicate that access is denied, and to provide a link 120 to a subscription page from which the user can subscribe to a fee-based web service.

With the disclosed techniques, instead of establishing a separate communication channel to receive the control data, a computing device (e.g., computing device 100) can use the same communication channel to receive both the control data and the requested web resources. Moreover, by including the control data as part of a web access response that also includes the requested resources, the computing device needs not handle an additional response separate from the web access response to receive the control data. All these can simplify the operations of the computing device and of the server, and reduce the network traffic caused by the transmission of control data, leading to more efficient use of computing and networking resources.

Moreover, the disclosed techniques also enable the server to unilaterally push control data to the computing devices, without requiring the computing devices to transmit specific requests for the control data other than regular web access requests. As a result, the updating of an app can be performed in a more uniform and synchronized fashion among multiple computing devices, especially for apps with build-in web browsing functions (e.g., WebView) that constantly transmit web access requests and receive web access responses.

II. Data Network System

Figure 2:
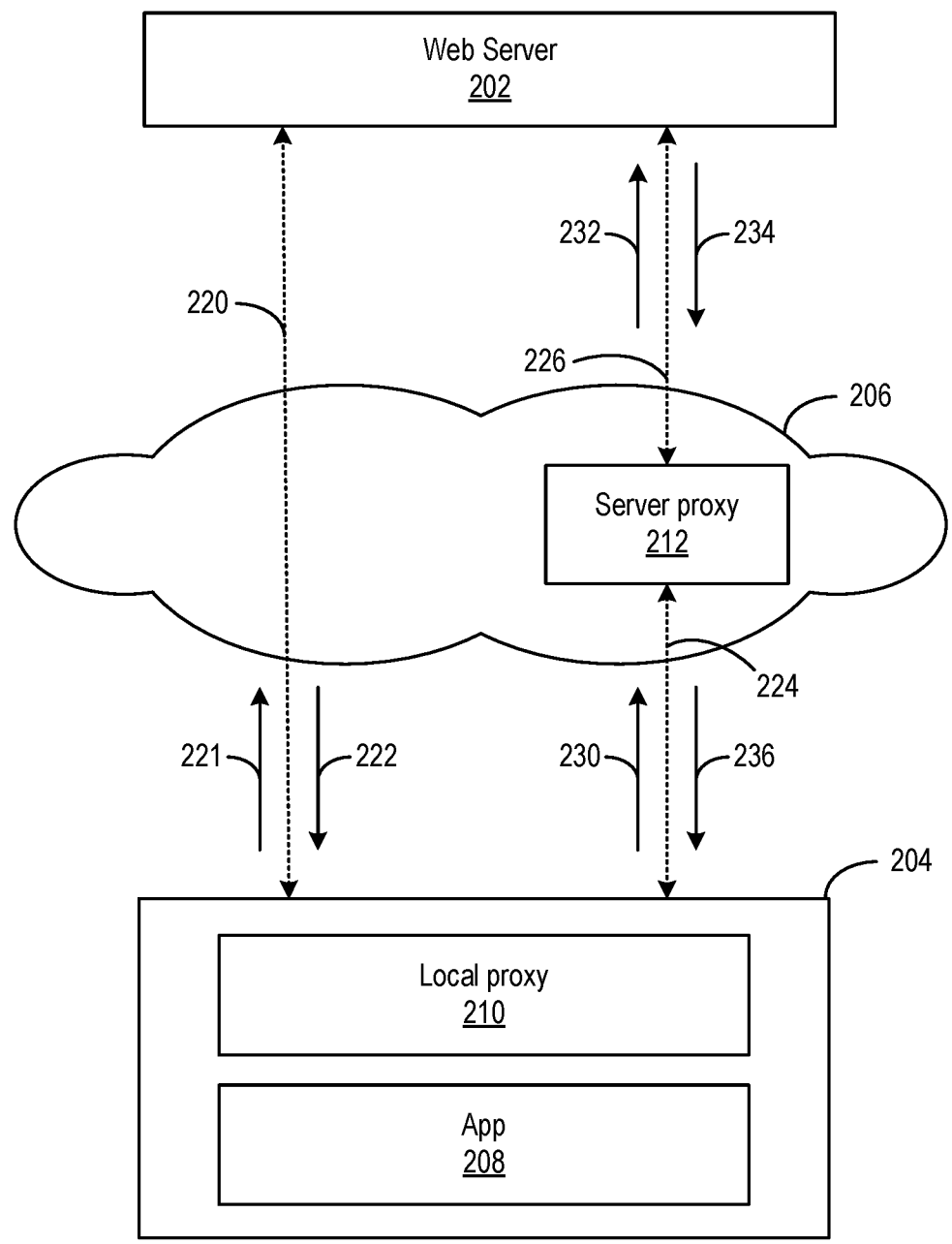
FIG. 2 is a simplified block diagram of a data network system, according to certain aspects of the present disclosure.

FIG. 2 is a simplified block diagram of a data network system 200, according to certain aspects of the present disclosure. Data network system 200 may include a web server 202 connected to a client device 204 through a communication network 206, which may include communication links using technologies such as Ethernet, IEEE 802.11, worldwide interoperability for microwave access (WiMAX), 3G, 4G, 5G, code division multiple access (CDMA), digital subscriber line (DSL), etc. Web server(s) may provide a set of web resources. For example, web server 202 may serve web pages, as well as other content, such as JAVA®, FLASH®, XML, and so forth. A user may send a request to web server 202 to upload and/or retrieve information (e.g., web content, images, videos, posts, etc.) hosted on web server 202. Web server 202 may also provide other web resources including, for example, receiving and routing messages. The messages can include, for example, instant messages, queued messages (e.g., email), text messages, short message service (SMS) messages, or messages sent using any other suitable messaging technique.

Client device 204 may correspond to a user and may comprise a processor, memory (with volatile memory and/or non-volatile storage drives), input and output interfaces, or other hardware or software known in the art. Client device 204 may include an app 208. App 208 may include similar elements as the app described in FIG. 1. For example, app 208 can provide web-browsing capabilities, and may include an input interface (e.g., text box 104 of FIG. 1) for inputting a web address and an output interface (e.g., output interface 108 of FIG. 1) for outputting web content. To provide the web-browsing capabilities, app 208 may also generate a web access request based on the web address received at the input interface, and transmit the web access request to web server 202 to request for certain web resources (e.g., web content). App 208 may also process a web access response including the requested web resources, extract the web resources from the web access response, and provide the web resources to the output interface. Moreover, app 208 may also extract control data included in the web access response, and update one or more elements of the app based on the control data, as discussed above.

Client device 204 may further include a local proxy 210, which can be a software application. Local proxy 210 can determine where to route the web access request generated by app 208. In a first mode of operation, local proxy 210 may transmit the web access request to web server 202. Local proxy 210 may establish a communication channel 220 with web server 202. Local proxy 210 may transmit a web access request 221 generated by app 208 to web server 202 via communication channel 220. Local proxy 210 may also receive a web access response 222 from web server 202 via communication channel 220. Local proxy 210 can provide web access response 222 to app 208, which can extract the web resources (e.g., web contents) included in the response, and provide the web resources to the output interface. In some embodiments, communication channel 220 can be a TCP communication channel, whereas web access request 221 can be an HTTP request and web access response 222 can be a HTTP response.

In a second mode of operation, local proxy 210 may also transmit a web access request to a server proxy 212. Server proxy 212 can be a computing device with a processor and a memory. Server proxy 212 can be part of communication network 206 as shown in FIG. 2, or part of web server 202. Server proxy 212 may request the web resources to web server 202 on behalf of app 208. In that case, local proxy 210 may establish a communication channel 224 with a server proxy 212, which also establishes a communication channel 226 with web server 202. Local proxy 210 may transmit a web access request 230 generated by app 208 to server proxy 212 via communication channel 224. Server proxy 212 may generate a web access request 232 based on web access request 230 (e.g., to request the same web resources as requested by web access request 230), and transmit web access request 232 to web server 202 via communication channel 226. Server proxy 212 may also receive a web access response 234 including the requested web resources from web server via communication channel 226. Server proxy 212 may generate a web access response 236 based on web access response 234 (e.g., by including the web resources included in web access response 234), and transmit web access response 236 to local proxy 210. Local proxy 210 can also provide web access response 236 to app 208, which can extract the web resources (e.g., web contents) included in the response, and provide the web resources to the output interface. In some embodiments, communication channels 224 and 226 can be TCP communication channels. Web access requests 230 and 232 can be HTTP requests, whereas web access responses 234 and 236 can be HTTP responses.

Server proxy 212 can act as an intermediary between web server 202 and client device 204. Server proxy 212 may control the access of client device 204 to the web resources hosted by web server 202 by transmitting control data to local proxy 210, to direct local proxy 210 to perform the first or second modes of operation based on the control data. For example, referring to the example of FIG. 1, a user may try to access zero-based web service via app 208, which generates web access request 230. Based on the access request to zero-based web service, local proxy 210 may operate under the second mode, and transmit web access request 230 to server proxy 212, which can track a number of web access requests associated with the zero-based web service from app 208. If the number of web access requests does not exceed a threshold, server proxy 212 may request the web resources on behalf of app 208 (e.g., by transmitting web access request 232). After server proxy 212 receives the requested web resources from web server 202, server proxy 212 can transmit a web access response (e.g., web access response 236) including the requested web resources to local proxy 210. On the other hand, if the number of web access requests associated with the zero-based web service has reached a threshold, server proxy 212 may transmit, as part of web access response 236, control data to local proxy 210, which then forward the control data (and web access response 236) to app 208. The control data can update the interfaces of app 208 (e.g., the rendering of a web page, displaying a message, etc.) to prevent the user from accessing the requested web resources via app 208.

Moreover, server proxy 212 may also grant client device 204 a different degree of access (e.g., unlimited access) to the web resources hosted on web server 202, by transmitting control data to direct local proxy 210 to operate under the first mode (i.e., communicating directly with web server 202), if the user has subscribed to a fee-based web service. Server proxy 212 may detect subscription activities (e.g., by detecting web access requests caused by the selection of subscription link 120) to determine that the user has subscribed to the fee-based web service. Based on this determination, server proxy 212 may transmit control data to local proxy 210, to cause it to establish communication channel 220 with web server 202. Local proxy 210 can then transmit subsequent web access requests to web server 202 without going through server proxy 212, to grant the user operating app 208 unlimited access to the web resources hosted on web server 202.

III. Control Data

Figure 3:
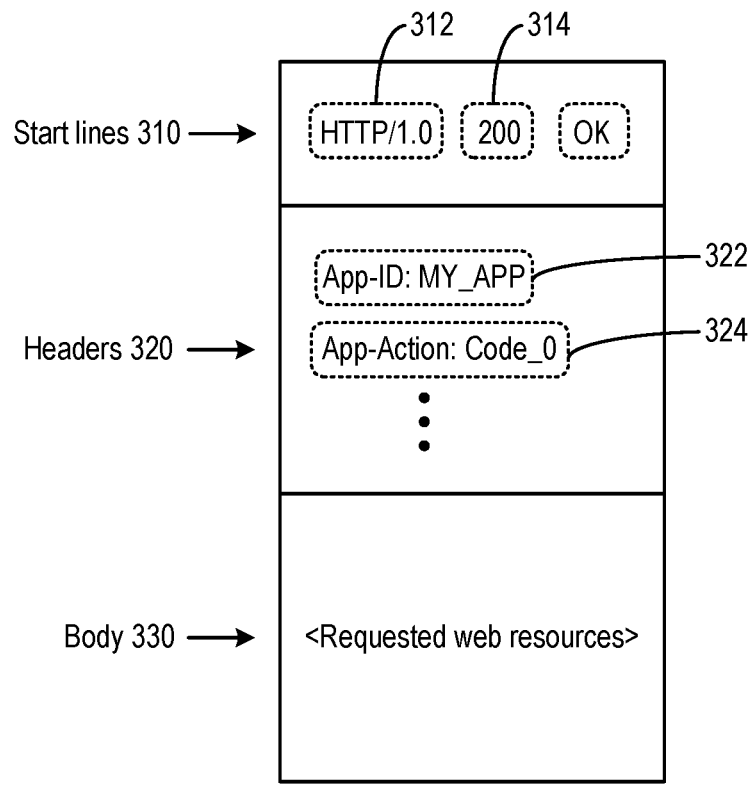
FIG. 3 is a simplified block diagram of an example of HTTP response that includes control data, according to according to certain aspects of the present disclosure.

FIG. 3 is a simplified block diagram of an example of HTTP response 300 that includes control data, according to certain aspects of the present disclosure. HTTP response 300 can be generated by, for example, server proxy 212 of FIG. 2. Server proxy 212 can transmit HTTP response 300 to client device 204 to control, for example, some aspects of app 208 and/or local proxy 210. While HTTP is described here for illustrative purposes, other protocols and communications technique may be used in alternative embodiments. Returning to FIG. 3, HTTP response 300 can be, for example, web access response 236 of FIG. 2. As shown in FIG. 3, HTTP response 300 includes start lines 310, headers 320, and body 330. Start lines 310 may include, for example, HTTP version information 312, a status code 314, and a reason phrase 316. HTTP version information 312 provides a version of HTTP protocol the message is associated with. In the example of FIG. 3, HTTP response 300 is associated with HTTP version 1.0. Status code 314 and reason phrase 316 can provide a status of processing a prior HTTP request that leads to HTTP response 300. In the example of FIG. 3, a combination of status code 314 and reason phrase 316 may indicate that the processing was successful. Body 330 includes the web resources requested by that prior HTTP request and may include, for example, documents, image data, media data, etc.

Headers 320 may include one or more headers, including headers 322 and 324. Each of headers 322 and 324 may include a name string and a value. In the example of FIG. 3, header 322 includes a name string "App-ID" and a value "MY_APP," whereas header 324 includes a name string "App-Action" and a value "Code_0." According to certain aspects of the present disclosure, the control data can be inserted in headers 320 as a combination of name strings and values. The combination of name strings and values can be determined based on a pre-determined semantic and structure of the control data. In the example of FIG. 3, both headers 322 and 324 can be part of the control data. For example, the "App-ID" name string of header 322 may indicate that header 322 carries an identifier ("MY_APP") of an app to be configured by the control data. Also, the "App-Action" name string of header 324 may indicate that header 324 carries a code that indicates which element of the app is to be updated, and what update(s) are to be made.

When receiving HTTP response 300 including headers 320, app 208 can process headers 322 and 324 based on the same predetermined semantic and structure of the control data. For example, app 208 may identify the "App-ID" name string of header 322 and extract the value "MY_APP," and compare the extracted value against an identifier of app 208 to determine whether HTTP response 300 contains control data for the app, or for other apps. Further, app 208 may also identify the "App-Action" name string of header 324, and determine a configuration update based on the value "Code_0."

FIG. 4 is a simplified block diagram of an example mapping table 400 that maps the configurations to different control data values, according to certain aspects of the present disclosure. Mapping table 400 can be stored in, or otherwise accessible by, both of server proxy 212 and app 208. In the example of FIG. 4, each of a set of values "Code_0," "Code_1," and "Code_2" is associated with an app element and a configuration setting. The configuration settings may include, for example, a configuration for displaying a webpage on the app, a configuration for performing a search with the app, or an user interface configuration of the app. For example, both "Code_0" and "Code_1" are associated with the operation of an search element (e.g., search element 114 of FIG. 1) of app 208, whereas "Code_2" is associated with the operation of an output interface (e.g., output interface 108 of FIG. 1) of app 208. Further, each of "Code_0," "Code_1," and "Code_2" may represent different configuration settings. For example, upon receiving "Code_0," app 208 can display a search input text box for receiving a search query. Also, upon receiving "Code_1," app 208 can direct the search query to a "DOODLE" search engine. Further, upon receiving "Code_2," app 208 can display an opaque layer in output interface 108 (e.g., to prevent the user from reading the web content rendered in the interface).

Server proxy 212 can also refer to mapping table 400 to determine the values to be written into header 324, based on the aforementioned triggering event. For example, if server proxy 212 receives an instruction to cause app 208 to display a search input text box, server proxy 212 may include "Code_0" in the HTTP response headers to be transmitted to app 208. Further, if server proxy 212 receives an instruction to cause app 208 to direct search queries to the "DOODLE" search engine, server proxy 212 may include "Code_1" in the HTTP response headers. Moreover, if server proxy 212 determines to deny app 208 access to the web resources included in the HTTP response, server proxy 212 may include "Code_2" in the HTTP response headers.

IV. System and Method for Provision of Control Data

Figure 5:
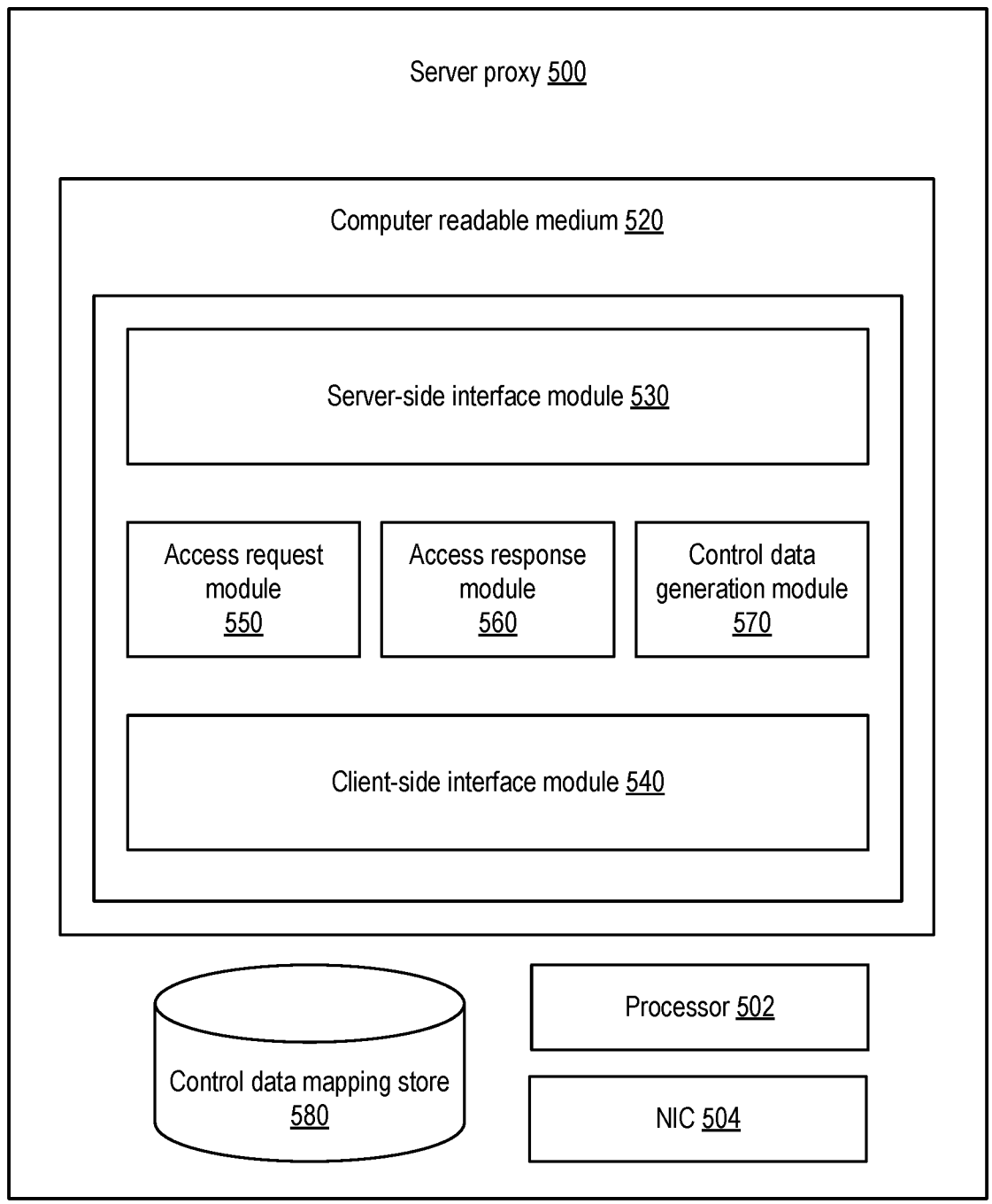
FIG. 5 is a simplified block diagram of an example of server proxy for transmission of control data, according to certain aspects of the present disclosure.

FIG. 5 is a simplified block diagram of an example of server proxy 500 for transmission of control data, according to certain aspects of the present disclosure. Server proxy 500 may be server proxy 212 of FIG. 2. Server proxy 500 may include one or more processors 502, a network interface card (NIC) 504, and computer readable medium 520 that stores a server-side interface module 530, a client-side interface module 540, an access request module 550, an access response module 560, and a control data generation module 570. Server proxy 500 may further include a control data mapping store 580.

Processor(s) 502 may include any suitable processing device or any combination of such devices. An exemplary processor may comprise one or more microprocessors working together to accomplish a desired function. The processor may include a central processing unit (CPU) that comprises at least one high-speed data processor adequate to execute program components for executing user and/or system-generated requests.

NIC 504 may provide a communication interface from server proxy 500 to other devices (e.g., client devices, servers, etc.) via one or more communication networks, including local area networks (LANs), wide area networks (WANs) (e.g., the Internet), and various wireless telecommunications networks. NIC 504 may comprise Ethernet cards, Asynchronous Transfer Mode NICs, Token Ring NICs, wireless network interface controllers (WNICs), wireless network adapters, and the like. NIC 504 may facilitate transmission and receipt of the input content to the social networking system.

Computer readable medium 520 may be any suitable device or devices that can store electronic data. A computer readable medium may be embodied by one or more memory devices, including a working memory, which may include a random access memory (RAM) or read-only memory (ROM) device. Examples of memory devices may include memory chips, disk drives, etc. Such memory devices may operate using any suitable electrical, optical, and/or magnetic mode of operation. Computer readable medium 520 may comprise a non-transitory computer-readable storage medium that stores a plurality of instructions executable by one or more processors 502. The plurality of instructions, when executed by one or more processors 502, may cause one or more processors 502 to perform any of the methods described herein. The plurality of instructions may include instructions corresponding to server-side interface module 530, client-side interface module 540, access request module 550, access response module 560, and control data generation module 570, and are loaded into computer readable medium 520 during run time.

Server-side interface module 530 may provide an interface between another server (e.g., web server 202, a subscription server, etc.) and other components of server proxy 500. Server-side interface module 530 may include logics for generating a web access request (e.g., web access request 232 of FIG. 2) to be transmitted to another server, and for processing a web access response (e.g., web access response 234 of FIG. 2) received from another server. As to be discussed in more details below, server-side interface module 530 may receive instructions from access request module 550 to generate the web access request. Server-side interface module 530 may also receive the web access response from another server, and forward the received web access response to access response module 560 for processing. In a case where server proxy 500 and the server is connected via a communication network (e.g., an Ethernet), server-side interface module 530 may transmit web access requests to the server, and receive web access responses from the server, via NIC 504.

Client-side interface module 540 may provide an interface between a client device (e.g., computing device 100 of FIG. 1, client device 204 of FIG. 2, etc.) and other components of server proxy 500. Server-side interface module 540 may include logics for processing a web access request (e.g., web access request 230 of FIG. 2) received from the client device, and for generating a web access response (e.g., web access response 236 of FIG. 2) to be transmitted to the client device. As to be discussed in more details below, client-side interface module 540 may receive instructions from access response module 560 and control data generation module 570 to generate the web access response. Client-side interface module 540 may also receive a web access request from the client device, and forward the received web access request to access request module 550 for processing. Client-side interface module 540 may also transmit web access responses to the client device, and receive web access requests from the client device, via NIC 504.

Access request module 550 may process a web access request received from a client device (via client-side interface module 540), and provide instructions to server-side interface module 530 to transmit a web access request to another server. Access request module 550 may process the web access request by, for example, extracting information identifying the requested web resources (e.g., an universal resource identifier (URI) or a partial URI included in an HTTP request). Access request module 550 may accumulate a number of web access requests directed to a specific web resource to implement a variable access policy, as discussed above. Access request module 550 may also generate a second web access request based on the received web access request (e.g., by including the URI or partial URI extracted from the received web access request), if the client device is granted access to the requested web resources based on the access policy. Access request module 550 can then instruct server-side interface module 530 to transmit the second web access request to the target server, to request the web resources on behalf of the client device.

Access response module 560 may process a web access response received from another server (via server-side interface module 530), and provide instructions to client-side interface module 540 to transmit a web access response to a client device. Access response module 560 may process the web access response by, for example, extracting web resources included in the response (e.g., the body of an HTTP response) and other configuration information (e.g., the start lines of an HTTP response). Access response module 560 may also receive control data from control data generation module, and generate an access response to include the extracted web resources and the control data. For example, access response module 560 may generate a second web access response as an HTTP response, with start lines incorporating the extracted configuration information, headers incorporating the control data, and the body incorporating the extracted web resources. Access response module 560 can then instruct client-side interface module 540 to transmit the second web access response to the client device, to control/configure one or more functionalities of the client device, as described above.

Control data generation module 570 may determine control data to be included in the web access response to be transmitted to the client device. Control data generation module 570 may include a trigger module (not shown in FIG. 5) to detect one or more triggering event for generating control data. The triggering event may include, for example, an instruction from another server to push software update, a number of web access request (e.g., for zero-rated web services) reaching a threshold, etc. Control data generation module 570 may also determine, based on the triggering event, the configuration to be effected at the client device. For example, as described above, to block access to the requested web resources, control data generation module 570 may configure the operation of an output interface of a web browsing app of the client device. Also, to grant unlimited access, control data generation module 570 may configure the operation of a local proxy of the client device such that that the local proxy directs subsequent web access requests to the web server instead of the server proxy. Control data generation module 570 may also refer to a control data mapping table (e.g., mapping table 400 of FIG. 4) to determine, based on the determined configuration, the control data to be included in the web access response to be transmitted to the client device, and provide the control data to access response module 560.

In some embodiments, control data generation module 570 may also encrypt the control data, and provide the encrypted control data to access response module 560. For example, control data generation module 570 may obtain a control data value (e.g., "Code_0") from mapping table 400, and generate a hash value based on the control data value. Control data generation module 570 may also generate a key (e.g., a HMAC key), and then encrypt the control data using the key to generate a signature. The identifier may be associated with the client device, or with the TCP communication channel (e.g., a session ID) between the client device and the server proxy. Control data generation module 570 may include the hash value, together with the encrypted control data in the web access request. A client device, upon receiving the web access request and the encrypted control data included in the web access request, can decrypt the control data with the HMAC key, compute a hash value based on the decrypted control data, and compare that against the hash value included in the web access request. If the two hash values matches, the client device may determine that the control data comes from a trusted source, and apply the configurations to the app and/or local proxy according to the control data value.

Control data mapping store 580 may comprise one or more mapping tables (e.g., mapping table 400 of FIG. 4) that map control data to different configurations. Control data generation module 570 may access control data mapping store 580 to obtain the mapping table for control data generation, as described above.

Figure 6:
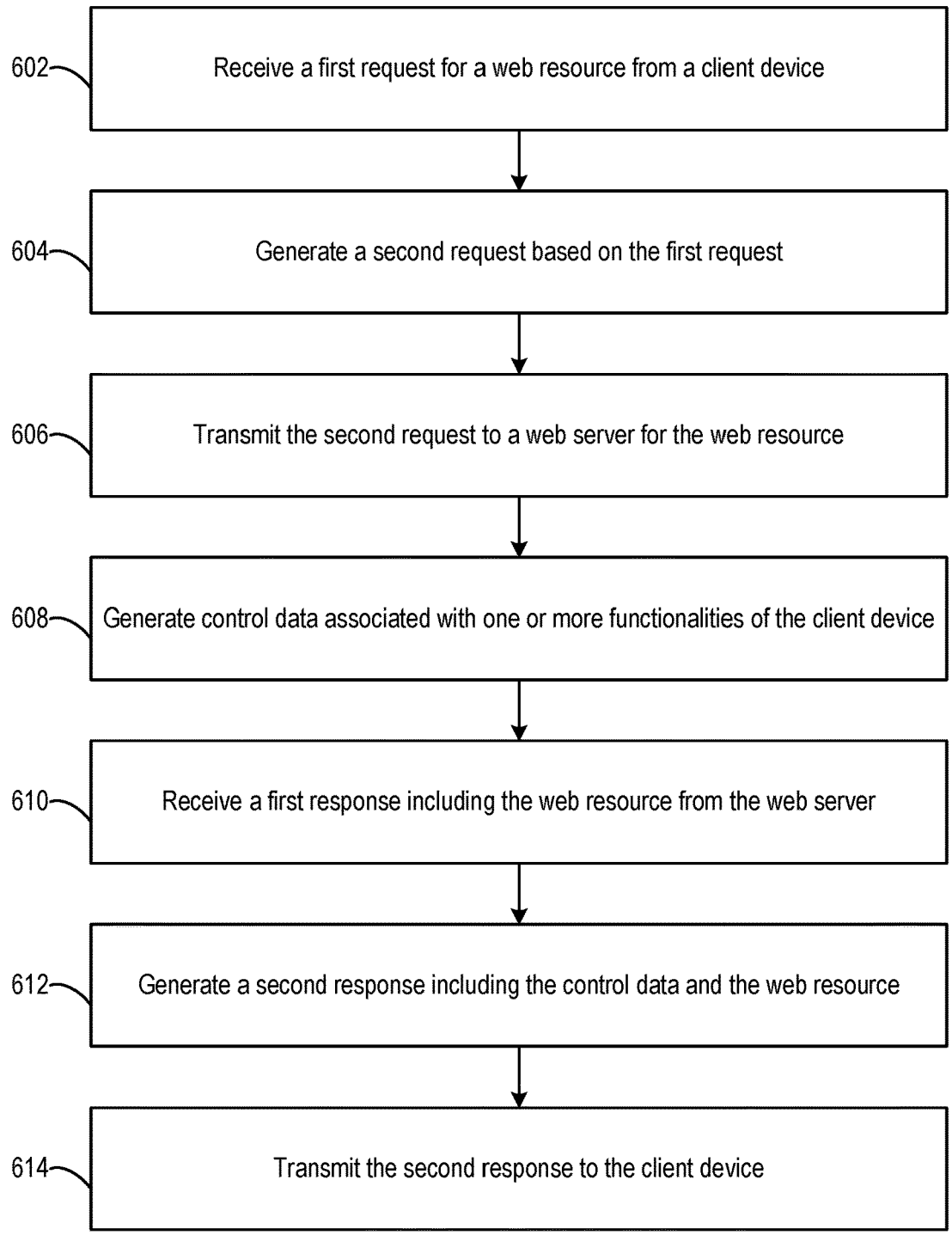
FIG. 6 is a simplified flowchart illustrating an example method for providing control data to a client device, according to certain aspects of the present disclosure.

FIG. 6 is a simplified flowchart illustrating an example method 600 for providing control data to a client device, according to certain aspects of the present disclosure. The method can be performed by, for example, server proxy 212 of FIG. 2 and server proxy 500 of FIG. 5.

At 602, the system may receive, from a client device (e.g., computing device 100 of FIG. 1, client device 204 of FIG. 2, etc.) a first request for a web resource. The first request may be an HTTP request including an URI or a partial URI of the web resource, whereas the web resource may be, for example, web content hosted on a web server (e.g., web server 202 of FIG. 2).

At 604, the system may generate a second request based on the first request. The second request may be a HTTP request including the URI (or partial URI) included in the first request. The system may generate the second request based on a determination that the client device is granted access to the requested web resource. The system then transmits the second request to the web server at 606.

At 608, the system may generate control data associated with one or functionalities of the client device. The one or more functionalities may include, for example, an operation of an output interface, a destination for transmitting subsequent web access request (e.g., whether to transmit the subsequent web access request to a server proxy or to the web server), etc. The control data may be generated based on detection of an external event such as, for example, receiving software patch from another server, completion of a subscription transaction, etc. Based on the external event, the system may determine a set of configurations to be applied to various components of the client device (e.g., app 208, local proxy 210, etc.). The system may refer to a control data mapping table (e.g., mapping table 400 of FIG. 4) and determine the control data based on the set of configurations.

At 610, the system may receive a first response including the requested web resource from the web server. The first response may be an HTTP response.

At 612, the system may generate a second response including the control data and the web resource. The second response may be an HTTP response with one or more headers generated from the control data. The control data may also be encrypted.

At 614, the system may transmit the second response to the client device, to control the one or more functionalities of the client device. For example, based on the control data included in the second response, the client device may display an opaque layer to deny the user access to the web content, transmit a subsequent web access request to the web server instead of the server proxy, etc.

V. Example Computing System

Figure 7:
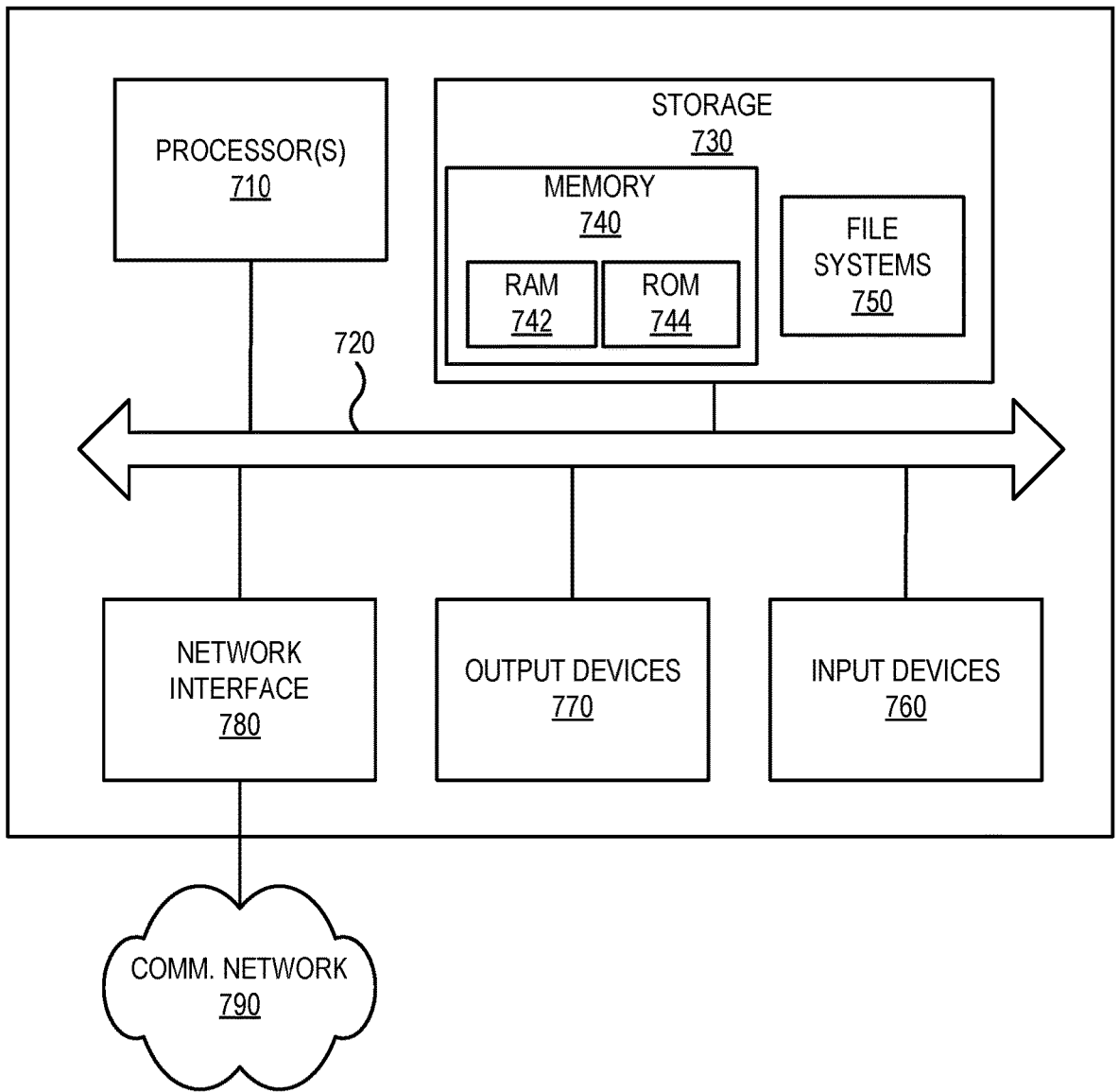
FIG. 7 is a simplified block diagram of an example computing system for implementing some of the examples disclosed herein.

FIG. 7 illustrates an example of a block diagram of a computing system. The computing system shown in FIG. 7 can be used to implement any computing device (e.g., computing device 100 of FIG. 1, client device 204 and server proxy 212 of FIG. 2 and server proxy 500 of FIG. 5, etc.) described herein in replacement of or to supplement to the descriptions provided. In this example, computing system 700 includes processor 710, bus 720, storage 730, memory 740, random access memory (RAM) 742, read-only memory (ROM) 744, file systems 750, user input device 760, output devices 770, network interface 780, and communication network 790. In the present example, user input device 760 is typically embodied as a computer mouse, a trackball, a track pad, a joystick, wireless remote, drawing tablet, voice command system, eye tracking system, and the like. User input device 760 typically allows a user to select objects, icons, text and the like that appear on output devices 770 via a command such as a click of a button or the like. Output devices 770 may include a screen associated with a computing device, virtual reality environment, projection system, speaker, and the like.

Examples of network interfaces 780 typically include an Ethernet card, a modem (telephone, satellite, cable, Integrated Services Digital Network (ISDN)), an asynchronous digital subscriber line (DSL) unit, FireWire® interface, universal serial bus (USB) interface, and the like. For example, network interfaces 780 may be coupled to communication network 790, to a FireWire® bus, or the like. In other embodiments, network interfaces 780 may be physically integrated on the processor 710, may be a software program, such as soft Digital Subscriber Line (DSL), or the like. Network interfaces 780 may correspond to NIC 504 of FIG. 5.

In various examples, computing system 700 typically includes familiar computer components such as processor 710 and memory 740 devices, such as RAM 742, ROM 744, file systems 750, and system bus 720 interconnecting the above components. Processor 710 may correspond to processor 502 of FIG. 5. Memory 740 may store, for example, server-side module 530, client-side interface module 540, access request module 550, access response module 560, and control data generation module 570 of FIG. 5. The modules can be executed by processor 710 to perform any of the methods described herein.

RAM 742 and ROM 744 are examples of tangible, non-transitory media configured to store data such as embodiments of the present disclosure, including executable computer code, human readable code, or the like. Other types of tangible media include floppy disks, removable hard disks, optical storage media such as CD-ROMS, DVDs and bar codes, semiconductor memories such as flash memories, battery-backed volatile memories, networked storage devices, and the like.

In various examples, computing system 700 may also include software that enables communications over a network such as Hypertext Transfer Protocol (HTTP), Transmission Control Protocol/Internet Protocol (TCP/IP), Real-Time Streaming Protocol (RTP/RTSP), and the like. In alternative embodiments of the present disclosure, other communications software and transfer protocols may also be used, for example Internetwork Packet Exchange (IPX), User Datagram Protocol (UDP), or the like.

Embodiments are in particular disclosed in the attached claims directed to a method, a system and a storage medium, wherein any feature mentioned in one claim category, e.g. method, can be claimed in another claim category, e.g. system or computer program product, as well. The dependencies or references back in the attached claims are chosen for formal reasons only. However any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Also, it is noted that individual examples may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. One or more processors may execute the software, firmware, middleware, microcode, the program code, or code segments to perform the necessary tasks.

Systems depicted in some of the figures may be provided in various configurations. In some examples, the systems may be configured as a distributed system where one or more components of the system are distributed across one or more networks such as in a cloud computing system.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented as a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A computer-implemented control method, comprising:
receiving, from a client device, a request for a web resource;
generating control data that identify a first application of a plurality of applications of the client device and a first element of a plurality of elements of the first application;
generating a response including the control data, the control data being included in one or more HTTP headers of the response; and
transmitting the response to the client device to enable the client device to, based on the control data:
select, from the plurality of applications, the first application, and
configure the first element of the first application.

2. The method of claim 1, wherein:
the web resource is a first web resource;
the control data is first control data;
the request is a first request;
the response is a first response;
the method further comprises:
receiving, from the client device, a second request for a second web resource;
generating a third request based on the second request;
transmitting the third request to a web server for the second web resource;
generating second control data that identify a second application of the client device and a second element of the second application;
receiving a second response including the second web resource from the web server;
generating a third response including the second control data and the second web resource; and
transmitting the third response to the client device to configure the second element based on the second control data and to provide access to the second web resource via the second application;
the method is performed by a server proxy;
the client device includes a local proxy; and
the second request is generated by the local proxy based on a web access request received by the second application.

3. The method of claim 2, wherein:
the first, second, and third requests are HTTP requests;
the first, second, and third responses are HTTP responses; and
the second control data are included in one or more HTTP headers of the third response.

4. The method of claim 1, wherein the control data include information comprising at least one of a configuration for displaying a message on the first application, a configuration for displaying an opaque layer over a web page, a configuration for performing a search with the first application, or an user interface configuration of the first application.

5. The method of claim 2, wherein the first control data and second control data also configure one or more functionalities associated with the local proxy.

6. The method of claim 5, wherein the first request is received from the local proxy through a first TCP connection established between the local proxy and the server proxy; and
wherein the second control data controls the local proxy to establish a second TCP connection with the web server, and to transmit the third request to the web server through the second TCP connection for the second web resource.

7. The method of claim 6, wherein the second control data control the second application to provide an activable interface element; and wherein the second control data control the local proxy to establish the second TCP connection and to transmit the third request based on detecting the activable interface element being activated.

8. The method of claim 1, wherein the control data is generated based on the request.

9. The method of claim 1, wherein the control data is encrypted with a signature.

10. The method of claim 1, wherein the control data further identify a configuration of the first application.

11. The method of claim 1, wherein the control data is generated based on an external event different from reception of the request.

12. The method of claim 1, wherein the control data includes an identifier of the first element of the first application; and
wherein the identifier indicates that a configuration is directed to the first element.

13. The method of claim 5, wherein the control data controls the local proxy not to transmit a fourth request to the web server for the first web resource.

14. The method of claim 1, wherein the control data is generated based on a number of requests received from the client device for the web resource exceeding a threshold.

15. The method of claim 1, wherein the control data includes an identifier of the first application, the identifier being part of a plurality of identifiers that identify a plurality of applications of the client device.

16. The method of claim 1, wherein the control data controls a local proxy of the client device not to transmit a subsequent request for the web resource.

17. The method of claim 1, wherein the response includes the web resource as part of a HTTP payload and enables the first element of the first application to provide access to the web resource.

18. The method of claim 1, wherein the control data controls the first application to display an indication that access to the web resource is denied.

19. The method of claim 1, wherein the first element provides a web-browsing function; and
wherein a second element of the plurality of elements of the first application provides a search function.

20. A system comprising
one or more processors; and
a non-transitory computer-readable medium storing instructions that, when executed by the one or more processors, cause the one or more processors to perform operations including:
receiving, from a client device, a request for a web resource;
generating control data that identify a first application of a plurality of applications of the client device and a first element of a plurality of elements of the first application;
generating a response including the control data, the control data being included in one or more HTTP headers of the response; and
transmitting the response to the client device to enable the client device to, based on the control data:
select, from the plurality of applications, the first application, and
configure the first element of the first application.

21. The system of claim 20, wherein:
the web resource is a first web resource;
the control data is first control data;
the request is a first request;
the response is a first response;
the operations further comprise:
receiving, from the client device, a second request for a second web resource;
generating a third request based on the second request;
transmitting the third request to a web server for the second web resource;
generating second control data that identify a second application of the client device and a second element of the second application;
receiving a second response including the second web resource from the web server;
generating a third response including the second control data and the second web resource; and
transmitting the third response to the client device to configure the second element based on the second control data and to provide access to the second web resource via the second application;
the system is part of a server proxy;
the client device includes a local proxy; and
the second request is generated by the local proxy based on a web access request received by the second application.

22. The system of claim 21, wherein:
the first, second, and third requests are HTTP requests;
the first, second, and third responses are HTTP responses; and
the second control data are included in one or more HTTP headers of the third response.

23. The system of claim 21, wherein the first control data and second control data include information comprising at least one of a configuration for displaying a message on the first application, a configuration for displaying an opaque layer over a web page, a configuration for performing a search with the first application, or an user interface configuration of the first application.

24. The system of claim 21, wherein the first control data and second control data also configure one or more functionalities associated with the local proxy.

25. The system of claim 24, wherein the first request is received from the local proxy through a first TCP connection established between the local proxy and the server proxy; and
wherein the second control data control the local proxy to establish a second TCP connection with the web server, and to transmit the third request to the web server through the second TCP connection for the second web resource.

26. The system of claim 25, wherein the second control data control the second application to provide an activable interface element; and
wherein the second control data control the local proxy to establish the second TCP connection and to transmit the third request based on detecting the activable interface element being activated.

27. The system of claim 20, wherein the control data is generated based on the request.

28. A non-transitory computer-readable storage medium storing a plurality of instructions executable by one or more processors, the plurality of instructions, when executed by the one or more processors, cause the one or more processors to:
receive, from a client device, a request for a web resource;
generate control data that identify a first application of a plurality of applications of the client device and a first element of a plurality of elements of the first application;

generate a response including the control data, the control data being included in one or more HTTP headers of the response; and transmit the response to the client device to enable the client device to, based on the control data:
 select, from the plurality of applications, the first application, and
 configure, based on the control data, the first element of the first application.

* * * * *